United States Patent [19]

Carty et al.

[11] 3,859,389

[45] Jan. 7, 1975

[54] MULTIPHASE ACRYLIC MODIFIERS FOR VINYL HALIDE POLYMERS

[75] Inventors: Daniel T. Carty, Willingboro, N.J.; James A. Oline, Wyncote, Pa.

[73] Assignee: Rohm and Haas Company, Philadelphia, Pa.

[22] Filed: Dec. 20, 1973

[21] Appl. No.: 426,973

Related U.S. Application Data

[60] Division of Ser. No. 299,492, Oct. 20, 1972, , which is a continuation of Ser. No. 108,177, Jan. 20, 1971, abandoned, which is a continuation-in-part of Ser. No. 55,979, July 17, 1970, abandoned.

[52] U.S. Cl. ........ 260/885, 260/23 ST, 260/23 AR, 260/23 XA, 260/31.6, 260/31.8 M, 260/876 R, 260/884, 260/886, 260/899, 260/901
[51] Int. Cl. ..................... C08f 15/00, C08f 19/00
[58] Field of Search ..................... 260/876 R, 885

[56] References Cited
UNITED STATES PATENTS

| | | | |
|---|---|---|---|
| 3,041,308 | 6/1962 | Baer | 260/876 R |
| 3,041,309 | 6/1962 | Baer | 260/876 R |
| 3,251,904 | 5/1966 | Souder et al. | 260/876 R |
| 3,488,743 | 1/1970 | Baer et al. | 260/87.9 |

*Primary Examiner*—Murray Tillman
*Assistant Examiner*—Richard B. Turer
*Attorney, Agent, or Firm*—Michael B. Fein

[57] ABSTRACT

Vinyl halide polymers characterized by superior mill roll release at high temperatures and resistance to "plate out", are attained by modifying the polymers with a multiphase acrylic composite polymer comprising (A) a first non-crosslinked phase of molecular weight of up to 450,000 polymerized from a first monomer emulsion or solution of at least 25 weight percent of an alkyl acrylate, wherein said alkyl group has 1 to 18 carbon atoms, 0 to 75 weight percent of another acrylic monomer and 0 to 75 percent of another copolymerizable ethylenically unsaturated monomer, and (B) a final, rigid thermoplastic phase polymerized in the presence of the first phase from an emulsion or solution of about 35 to 100 weight percent of at least one monomer which is a methacrylate, acrylate, styrene or substituted styrene, 0 to 65 weight percent of another acrylic monomer, and 0 to 65 weight percent of another copolymerizable ethylenically unsaturated monomer, wherein the rigid thermoplastic phase has a molecular weight of from about 400,000 to about $5 \times 10^6$.

5 Claims, No Drawings

MULTIPHASE ACRYLIC MODIFIERS FOR VINYL HALIDE POLYMERS

This is a divisional of Ser. No. 299,492 filed Oct. 20, 1972, which is in turn a continuation of Ser. No. 108,177 filed Jan. 20, 1971 and now abandoned, which is in turn a continuation-in-part of Ser. No. 55,979 filed July 17, 1970, and now abandoned.

Vinyl halide polymers are a class of materials well known in the art, and are widely used for their excellent balance of physical properties, economy, and availability. Included are homopolymers and copolymers of vinyl halides generally, and particularly the polymers and copolymers of vinyl chloride. The copolymers contemplated in the art by the expression vinyl halide copolymers typically comprise the polymers resulting from the polymerization of a monomer mixture comprising at least 80% by weight of a polyvinyl halide with up to about 20% by weight of another monovinylidene compound copolymerizable therewith, such as vinyl acetate, methyl methacrylate, styrene or the like.

The usefulness of vinyl halide polymers can be increased by physically blending various modifiers with the polymers prior to use for plastic objects. These additives include materials such as lubricants, stabilizers, toners, fillers, pigments, crosslinking agents, tackifiers, plasticizers, processing aids, impact modifiers, and "deflection temperature under load" improvers. The present invention however is concerned only with the performance of rigid and plasticized vinyl halide polymers containing resinous modifiers which function as processing aids. These modifiers when added to vinyl halide polymers produce a substantial improvement in the processing behavior of the polymers particularly in calendering, milling and rolling.

Conventionally, styrene/acrylonitrile copolymers, or styrene/alkyl methacrylate interpolymers have been used to improve the processing characteristics of vinyl halide polymers during operations such as milling, calendering or the like, as exemplified by Jennings, U.S. Pat. No. 3,646,417 and Schwaegerle, U.S. Pat. No. 2,791,600. In order to increase production and, in some cases, to produce a product of particular desirable properties which are promoted by rapid operation, it is often desirable to conduct milling, calendering or like operations at higher than conventional rates. Such higher rates of operation however are accomplished by higher temperatures — temperatures at which the conventional aids begin to lose their process-lubricating qualities. As a result, the vinyl halide polymer develops a tendency to adhere to equipment surfaces. It has been found that the modifiers of the present invention, which are alkyl acrylate-hard phase composite polymers of particular compositions and properties, when added to vinyl halide polymers, impart superior mill roll release at high temperatures and resistance to "plate out".

Souder et al., U.S. Pat. No. 3,251,904, shows a polyvinyl chloride (PVC) modifier of (I) 60 to 25 parts of methyl methacrylate or methyl methacrylate and another monomer and (II) 40 to 75 parts alkyl acrylate polymers or polymers of an alkyl acrylate and another monomer. Netherlands Pat. No. 69/05725 (Monsanto) shows a modifier of PVC that is an alkyl acrylate homopolymer and/or a copolymer of 5 to 95 weight percent alkyl acrylate and 95 to 65 weight percent of another alkyl acrylate as a processing aid. U.S. pending application, Ser. No. 31,754 filed 4/24/70, Ryan, describes a PVC modifier which comprises a first cross-linked acrylic elastomer phase and a second acrylic rigid phase. The modifier imparts low die swell characteristics to the PVC. U.S. pending application, Ser. No. 42,882, Whang, shows polymeric modifiers of molecular weights of from 1,500 to less than 10,000 containing the residue of (A) from 75 to 100 percent by weight alkyl methacrylate and (B) from 0 to 25 percent of at least one ester of acrylic or methacrylic acid, styrene or substituted styrene.

The prior art does not teach the particular composition of the modifiers of the present invention and the superior mill roll release and resistance to plate-out imparted by the modifiers to vinyl halide polymers. Plate-out or roll plating or die-lip deposit has plagued processors from the earliest days of vinyl halide polymer compounding. The build-up of a deposit of incompatible materials on metal processing or finishing surfaces is more than an annoyance. Changes in product appearance, contamination, and disruption of production due to plate-out cost money.

Another problem encountered in milling, calendering, extrusion and like operations as applied to vinyl halide polymers is the tendency of the polymer to adhere to processing surfaces at high temperatures. In many operations, it is advantageous to operate at high processing temperatures to increase throughput and to produce a product of certain desired properties. However, at these processing temperatures, vinyl halide polymers containing conventional modifiers tend to stick or adhere to the surfaces of equipment. The polymers do not readily release from the surfaces and are therefore severely damaged when recovered from processing. The addition of the processing aids of the present invention effectively prevents these problems. The modified compositions of the present invention comprise about 50 to 98 weight percent poly(vinyl halide) and about 2 to 50 weight percent of a multiphase acrylic composite polymer comprising (A) a first non-crosslinked "soft" phase of molecular weight of up to 450,000, preferably 7,500 to 50,000 polymerized from a first monomer emulsion or solution of at least 25 weight percent of an alkyl acrylate wherein the alkyl group has 1 to 18 carbon atoms, 0 to 75 weight percent of another acrylic monomer, and 0 to 75 of another copolymerizable ethylenically unsaturated monomer, and (B) a final, rigid thermoplastic phase polymerized in the presence of the elastomer phase from a second monomer emulsion or solution of about 35 to 100 weight percent of at least one monomer which is a methacrylate, acrylate, styrene or substituted styrene, 0 to 65 weight percent of another acrylic monomer, and 0 to 65 weight percent of another copolymerizable ethylenically unsaturated monomer, wherein the rigid thermoplastic phase has a molecular weight of from 400,000 to about $5 \times 10^6$.

The composite polymer material is ordinarily and preferably prepared by emulsion or solution polymerization of the first phase as a discrete phase from a monomer composition of at least 25 weight percent of an alkyl acrylate with an alkyl group of 1 to 18 carbon atoms. Upon completion of the polymerization of the first phase, i.e., substantial exhaustion of the monomers in the initial polymerization composition, the rigid thermoplastic phase is then formed by polymerization in the presence of the first phase, in the same emulsion or solution, from a monomer mix comprising at least about 35 weight percent of a methacrylate, acrylate, styrene or substituted styrene monomer. The polymerization of the rigid thermoplastic phase of the composite is preferably conducted in such a fashion on that substantially all of the rigid phase material is formed on or near the surface of the first phase as hereinafter more fully described, and without the formation of substantial numbers of new particles in the emulsion.

The first stage of the polymers of the present invention may be polymerized from a mixture containing 25 to 95, or preferably 35 to 45 weight percent of an alkyl acrylate wherein the alkyl group has 1 to 12 carbon atoms. Preferred alkyl acrylates include butyl acrylate, ethyl acrylate and 2-ethylhexyl acrylate.

The first or soft phase may be polymerized from a monomer emulsion or solution containing 0 to 75 weight percent of another acrylic monomer or between 35 to 65 weight percent monomer which may be acrylonitrile, methacrylonitrile, vinyl acetate, acrylic acid, methacrylic acid, acrylamide, methacrylamide, N-methylol acrylamide, octyl acrylate, chloroethyl acrylate, alkylthioalkyl acrylates such as ethylthioethyl acrylate, and the like, alkoxyalkyls such as methoxyethyl acrylate, and the like, and alkyl methacrylates wherein the alkyl group contains 4 to 12 carbon atoms and others.

The monomer emulsion or solution which polymerized to the first phase may also contain 0 to 75 weight percent, or between 35 to 65 weight percent of another copolymerizable ethylenically unsaturated monomer. Such copolymerizable monomers include styrenes such as styrene, p-chlorostyrene, nitrostyrene, and $\alpha$-methyl styrene; vinyl toluene; alkyl vinyl ethers; alkyl vinyl ketones; chloroethyl vinyl ethers, and the like. In one particular embodiment of the present invention, the vinyl halide polymers characterized by superior mill roll release and resistance to plate-out are modified with non-crosslinked polymers of molecular weight of up to 450,000 polymerized from a monomer mixture of alkyl acrylate described above and a member selected from the group consisting of acrylonitrile, methacrylonitrile, styrene, and substituted styrenes. In this embodiment no final, rigid thermoplastic stage is used.

Most preferred soft stages within the scope of the present invention include acrylic interpolymers prepared from monomer mixtures comprising about 35 to 100 parts by weight butyl acrylate monomers, about 0 to 65 parts by weight other acrylic monomers, and about 0 to 65 parts by weight of other non-acrylic ethylenically unsaturated monomers.

The soft stage of the present invention must have a molecular weight of up to 450,000. Compositions of molecular weights outside of this range do not impart the resistance to plate out and most importantly do not impart the superior mill roll release characteristics to vinyl halide compositions which are critical features of the compositions of the present invention. A preferred molecular weight range for the first phase of the multiphase acrylic composite interpolymer of this invention is 10,000 to 50,000. Unless otherwise noted in this specification, the term "molecular weight" refers to viscosity average molecular weight ($\overline{M}_v$). The elastomeric phase of the multiphase acrylic composite interpolymers of this invention may be defined in terms of it characteristic. It should be noted that although the characteristic molecular weight range for the present elastomers is a critical feature of the present invention, novelty resides, not here alone, but rather in the manner in which this feature interdependently and cooperatively combines with the final rigid thermoplastic phase to produce a modifier which imparts to vinyl halide polymers the surprising characteristics of superior mill roll release and resistance to plate out. It has also been found that the multiphase acrylic composite interpolymers, in addition to imparting mill roll release and resistance to plate-out, additionally may provide a polyvinyl chloride system of excellent clarity. Furthermore, the present modifiers are easily isolated through spray drying and are quite suitable for powder blending.

The rigid thermoplastic phase of the composite interpolymer of the present invention includes the acrylic thermoplastics polymerized from monomer mixtures comprising 35 to 100 weight percent of at least one monomer which is a methacrylate, acrylate, styrene or substituted styrene, one or more acrylic comonomers in quantities of 0 to 65 weight percent, and 0 to 65 weight percent of another ethylenically unsaturated monomer. The thermoplastic phase may be polymerized from a monomer mixture containing 50 to 90 weight of at least one monomer which is the methacrylate, acrylate, styrene or substituted styrene. Suitable methacrylates and acrylates include alkyl and aryl esters of methacrylic and acrylic acid wherein the alkyl group may be straight chain, branched chain, or cycloalkyl. The cycloalkyl group may be either bridged or unbridged. The term "aryl" includes aralkyl and alkaryl groups which may be substituted, if desired, on both the aliphatic portions and on the aromatic portions. The alkyl acrylates and methacrylates usually include those wherein the alkyl group contains 1 to 18 carbon atoms and the cycloalkyl acrylates are usually those wherein the cycloalkyl group contains 4 to 10 carbon atoms. In the preferred alkyl acrylates and methacrylates, the alkyl groups contain 1 to 4 carbon atoms. Examples of alkyl- and aryl- methacrylates and acrylates include methyl methacrylate, ethyl methacrylate, n-propyl methacrylate, isopropyl methacrylate, n-butyl methacrylate, isobutyl methacrylate, stearyl methacrylate, phenyl methacrylate, benzyl methacrylate, cyclohexyl methacrylate, isobornyl methacrylate, nobornyl methacrylate, fenchyl methacrylate, isofenchyl methacrylate, bornyl methacrylate, the corresponding acrylates and the like. Suitable substitutions on these methacrylates include halogen (e.g. chlorine), hydroxy, alkoxy (e.g. methoxy), alkylthio (e.g. ethylthio), cyano, and the like.

When substituted styrene is utilized as a component, the substituents usually are from about 1 to 5, preferably about 1 to 3 carbon atoms is chain length, but may be other non-deleterious substituents. Exemplary of the substituted styrenes useful in the acrylate polymers of the present invention are $\alpha$-methyl styrene, chlorostyrene, $\alpha$-hydroxy methyl styrene, and the like. Exemplary substituents for such compounds are halogens, hydroxy groups, alkoxy groups, as well as lower alkyl groups, etc.

The rigid thermoplastic phase is polymerized from monomer mixtures containing 0 to 65 weight percent or 5 to 15 weight percent of other acrylic comonomers such as other alkyl and aryl methacrylates alkyl and aryl acrylamides, substituted alkyl and aryl acrylic and methacrylic monomers, where the substituents can be halogen, alkoxy, alkylthio, cyanoalkyl, amino alkylthio, and other like substituents. The final rigid phase is prepared from monomer mixtures which also contain 0 to 65 or 5 to 15 weight percent of another ethylenically unsaturated monomer which imparts a rigid character to the rigid phase, such as vinyl aromatics, preferably styrene and α-methylstyrene, vinyl and vinylidene halides, and vinyl-substituted nitriles, vinyl esters, vinyl ethers, vinyl amides, vinyl ketones, olefins, and the like.

The rigid phase is further characterized by molecular weight ranging from about 400,000 to $5 \times 10^6$, preferably 750,000 to $3 \times 10^6$. A particularly effective molecular weight for attaining the full benefits of the present invention is about 750,000 to $1 \times 10^6$, which level is also relatively convenient to attain in preparing the composite interpolymers of the present invention.

The modified compositions of the present invention may contain from 75 to 99.9 percent by weight of a vinyl halide polymer modified with from about 0.1 to 25 percent by weight of the multiphase acrylic composite interpolymer modifier. Usually, however, and particularly when the modified compositions are used in a milling or calendering operation, the amount of modifier varies from 1 to about 10 percent by weight, preferably about 2 to 4 percent by weight. The modifiers of this invention comprise from 50 to 90 percent by weight of the lower alkyl acrylate-containing phase, from 10 to 50 percent by weight of the final rigid thermoplastic phase. In its preferred composition, the modifiers of the present invention contain from 50 to 70 percent by weight of the first phase and from 30 to 50 percent by weight of the thermoplastic phase. The above percentages are based on the total multiphase acrylic composite interpolymer modifier content of the vinyl halide polymer material.

The composite acrylic interpolymers of the present invention are prepared by solution, suspension or emulsion polymerization procedures utilizing a multi-stage or sequential technique. In simplest form, the first phase is formed in an initial stage and the rigid thermoplastic phase is formed in a second stage. Either the first or rigid phases can themseleves also be sequentially polymerized. The monomers of the initial stage, together with polymerization initiators, soap or emulsifiers, polymerization modifiers and chain transfer agents and the like are formed into the initial polymerization mix and polymerized, e.g. by heating and mixing the emulsion, in well known and wholly conventional fashion, until the monomers are substantially depleted and a seed polymer is formed. Monomers of the second, and in turn, of each additional stage are then added with appropriate other materials e.g. supplementary initiators, soap, modifiers, and the like, so that the desired polymerization of each stage occurs in sequence to substantial exhaustion of the monomers. In each stage subsequent to the first, the amounts of the initiator and soap, if any, are maintained at a level such that polymerization occurs at or near the surface of the existing particles, and no substantial number of new particles, or seeds, form in the emulsion. When the phases of the composite interpolymer are either themselves formed by sequential polymerization, the monomer constituents of the various stages of each phase may vary from stage to stage, or all the components can be present throughout the entire phase polymerization. The stages can vary in hardness, from a very soft elastomer first stage seed to the hardest rigid thermoplastic. Both the elastomer and the rigid thermoplastic can contain chain transfer agents, in one or all stages, and, if desired the rigid thermoplastic stage can contain polyfunctional crosslinking monomers. However, it is a characteristic of the present invention that the first soft stage is non-crosslinked. What is meant by the term "non-crosslinked" is that no cross linking monomers are present in the elastomer stage.

As already described, and as will be shown in the examples infra control of the molecular weight of the first phase up to 450,000 is essential to the present invention. Preferably the molecular weight is in the range of 7,500 up to 50,000 or to 450,000. It has been found that excellent polyvinyl halide processing modifiers result from compositions where the molecular weight of the first stage is of this critical range. Numerous techniques are known for control of molecular weight and there is no criticality in the present invention in any particular technique however a preferred technique is the use of a chain transfer agent such as an alkyl mercaptan in the polymerization mix of the first stage or stages in which the elastomeric phase is polymerized. Suitable chain transfer agents in this invention include the $C_4$ to $C_{12}$ and higher alkyl mercaptans particularly n-dodecyl mercaptan. Other techniques for controlling molecular weight of the elastomeric phase include the use of peroxide, operations at high temperatures of the use of allyl compounds.

The polymerization reactions can be initiated by either thermal or redox type initiator systems. Examples of thermal initiators include the organic peroxides, such as benzoyl peroxide, substituted benzoyl peroxides, acetyl peroxides, lauroyl peroxide, t-butyl hydroperoxide, di-t-butyl hydroperoxide, peresters, such as t-butyl peroxypivilate, azo-type initiators such as azobisisobutyronitrile, persulfates, such as sodium, potassium or ammonium persulfate, and peroxyphosphates such as sodium, potassium, or ammonium peroxyphosphate. Redox initiators are generally a combination of a hydroperoxide, such as hydrogen peroxide, t-butylhydroperoxide, cumene hydroperoxide, di-isopropylbenzene hydroperoxide, and the like, with a reducing agent, such as a sodium, potassium, or ammonium bisulfite, metabisulfite, or hydrosulfite, sulfur dioxide, hydrazine, ferrous salts, ascorbic acid, sodium formaldehyde sulfoxylate and the like, as are well known in the art.

Examples of emulsifiers or soaps suited to polymerization processes of the present invention include alkali metal and ammonium salts of alkyl, aryl, alkaryl, and aralkyl sulfonates, sulfates and polyether sulfates, ethoxylated fatty acids, esters, alcohols, amines, amides, alkyl phenols, complex organophosphoric acids and their alkali metal and ammonium salts.

The thermoplastic vinyl halide polymers utilized in the present invention are the polymers and copolymers of vinyl halides, preferably chlorides, widely utilized in the production of plastic articles. These polymers are referred to as vinyl halide or vinyl chloride polymers in the present invention, and for most all uses must be modified, compounded or copolymerized with other materials to provide processable and useful compositions. For the purpose and scope of this specification the term "vinyl chloride polymers" or compositions will include all compositions which have vinyl chloride or other halide as the major (greater than 50%) component monomer. The compositions include but are not limited to: poly(vinyl chloride) [PVC], copolymers of vinyl chloride with other monomers that include vinyl alkanoates such as vinyl acetate and the like, vinylidene halides such as vinylidene chloride, alkyl esters of carboxylic acids such as acrylic acid, ethyl acrylate, 2-ethylhexyl acrylate and the like, unsaturated hydrocarbons such as ethylene, propylene, isobutylene and the like, allyl compounds such as allyl acetate and the like; for flexibility vinyl halide polymers are often compounded with plasticizers such as dioctyl phthalate, poly(propylene adipate) and the like, and other modifiers such as chlorinated polyethylene; and many other materials are often included. The molecular weight and molecular weight distribution of the polymers is not critical to the aims, purposes and results of using this invention. For general applications vinyl chloride polymers with Fikentscher K-values in the range of 40 to 95, preferably about 50 to 75, are generally used. The Fikentscher K-value is determined by the formula $$\text{Log}[\nu]\ \text{rel}/C = (75 \times 10^{-6}K^2)/(1+1.5 \times 10^{-3}KC) + 10^{-3}K$$

where $C$ is 0.5 gm/100 ml. concentration of polymer in solvent, $[\nu]$ rel is relative viscosity in cyclohexanone at 25°C. and $K$ is Fikentscher value.

When copolymers of vinyl chloride are utilized in the practice of the present invention, it is usually preferable to utilize a polymer containing from 0 to 15 weight percent of comonomer. The preferred comonomer is preferably the vinyl alkanoate, and is most preferably vinyl acetate. The most preferable copolymer contains up to 10 weight percent of the comonomer, with the remainder being vinyl chloride.

The copolymers of vinyl chloride and another monomer, mentioned above, are often softer than homopolymers of vinyl chloride.

Finally, the most preferred polymer, and the polymer which is most effectively modified by the composite interpolymers of the present invention is the homopolymer of vinyl chloride.

The above copolymers vary in physical characteristics such as viscosity, and molecular weight. The copolymers generally are of slightly lower molecular weights than PVC. Also, the viscosity values are often slightly lower, although generally within the above range. These differences however, are not limiting to the present invention which is directed to modifying such copolymers and not the polymers themselves. The polymers, however, as is obvious, must be suitable for the use desired when modified, and physically must be of a type to which the present modifiers can be added.

Blends of the composite interpolymer and the vinyl halide polymer can be accomplished by any convenient technique. Entirely satisfactory blends can be accomplished on a roll mill at convenient and customary operating conditions, such as about 350°F. in about 5 minutes or less time. Dry mixing techniques, as with a mechanical mixer-blender device, can also be employed. The powder blends can, if desired, be processed in commercial extrusion equipment at conditions varying with the molecular weight of the polyvinyl halide used and the equipment employed for that purpose.

Certain processing aids, stabilizers, and the like are often incorporated in the blades. The stabilizers which serve to prevent the breakdown of the polyvinyl halide, are of several different types, including both varieties which stabilize against thermal and ultraviolet light stimulated oxidative degradation, discoloration, and the like.

In a particularly notably aspect of the present invention, it has been found that in applications that would otherwise require vinyl halide polymers modified with conventional lubricants, vinyl halide polymers containing the modifiers of the present invention may be used without any of these other conventional lubricants. In some instances however it may be advantageous to utilize the compositions of the present invention with lubricants. In such cases suitable lubricants include stearic acid, stearyl alcohol, licosanol, and other known types. Certain known lubricants may impart improved processability to polyvinyl halides at high temperatures but these lubricants adversely affect clarity of the polymers. This point will be illustrated in the examples of this specification by a comparison between compositions containing a conventional lubricant and compositions containing the acrylic composite interpolymer of this invention.

Other inclusions of the blends prepared in accordance with the present invention include colorants, including organic dyes, such as anthraquinone red, and the like, organic pigments and lakes such as phthalocyanine blue and the like, and inorganic pigments such as titanium dioxide, cadmium sulfide, and the like; fillers and particulate extenders such as carbon black, amorphous silica, asbestos, glass fibers, magnesium carbonate, and the like; plasticizers such as dioctyl phthalate, dibenzyl phthalate, butyl benzyl phthalate, hydrocarbon oils, and the like; and impact modifiers such as typical methacrylate/butadiene/styrene modifiers and others.

While only a few of such materials have been specifically recited, it is not intended to exclude others; the recitation is exemplary only, and each category of additives is common and well-known in the art, including extremely large numbers of materials which are equally well suited for inclusion in the materials of the present invention.

Such inclusions can be made at any stage of preparation in accordance with accepted techniques well-known to those ordinarily skilled in the art, in proportions which are commonly employed. Such additional materials are not of particular significance in the present invention and form no part thereof.

To assist those skilled in the art in the practice of the present invention, the following modes of operation are set forth as illustrations, parts and percentages mean by weight unless otherwise specifically noted.

EXAMPLE I

The following procedure illustrates a process for making the multiphase acrylic composite polymers of the present invention. The polymer illustrated is characterized by a butyl acrylate/styrene (40/60) first stage and a methyl methacrylate/ethyl acrylate (45/5) second stage value where this ratio of the first stage to the second stage is 1/1.

Two parts of acetic acid (5% aqueous solution) and 881 parts of distilled water are mixed under nitrogen with stirring. The temperature is adjusted to 40°C. and 82 parts of a monomer mixture is added. The monomer mixture contains 5 parts acetic acid (5% aqueous solution), 3.5 parts of a 20% aqueous solution of sodium lauryl sulfate, 1.5 parts of an 80% concentrate of the primary phosphates of octylphenoxypolyethoxyethanol in water, 170 parts of distilled water, 15 parts n-dodecyl mercaptan, 200 parts n-butyl acrylate, 300 parts styrene and 5 parts cumene hydroperoxide. A solution (26 parts) of 1 part sodium sulfoxylate formaldehyde in 25 parts water is added and the nitrogen sparge is reduced. Over 1.5 hours an additional 618 parts of the above monomer mix are added. After the reaction is completed, the product is filtered and the emulsion is evaporated in a vacuum oven for 2 to 3 days at 60°C. to give a semi-solid material, $[\nu]$acetone = 0.11.

Distilled water, 484 parts and 796 parts of an emulsion of the preceding-prepared polymer (250 parts solids) are mixed under nitrogen sparge. The temperature is adjusted to 44° – 45°C. and a solution (26 parts) of 1 part sodium sulfoxylate formaldehyde in 25 parts water is added. A monomer mixture, 359.63 parts, is then added to the reaction mixture over a period of about one hour. The mixture contains 1.25 parts of an 80% concentrate of the primary phosphate of octylphenoxypolyethoxyethanol in water, 108 parts of distilled water, 225 parts methyl methacrylate, 25 parts ethyl acrylate and 0.38 parts cumene hydroperoxide. The resulting product (butyl acrylate/styrene//methyl methacrylate/ethyl acrylate 20/30//45/5) is cooled and filtered through cheesecloth. An aliquot of the emulsion is evaporated in a vacuum oven for 2 to 3 days at 60° C. to yield a solid of $[\nu]$ acetone = 0.78. The balance of the emulsion was spray dried with good recovery and good product to dusting ratio.

EXAMPLE II

The composition prepared in Example I and other polymers indicated in Table I are prepared according to the same general procedure and incorporated into polyvinyl halide compositions by the following procedure.

One hundred grams of a hand mixture of 97 parts of a polyvinyl chloride, 3 parts of the modifier indicated in the Table I, 2 parts of a tin stabilizer, and 1.0 parts lubricants, is blended at 26/20 rpm. for 3 minutes at 350°F. The mixture is then formed into sheet by milling, 3 minutes at 425°F., 21/20 rpm. The sheets are compression molded into ⅛ inch thick slabs at 350°F. according to a cycle of 3 minute preheat, 2 minutes at 70 tons pressure followed by 3 minutes cooling under pressure. During the high temperature milling operation, the samples are rated for roll release according to the following system:

| | |
|---|---|
| p (poor) | – only edges of stock can be removed with difficulty. |
| F (fair) | – larger portions of the stock can be removed |
| G (good) | – most of the stock can be removed with some difficulty |
| E (excellent) | – entire stock can be removed with no sticking |

These samples are also rated for mill stability and clarity of final sheet according to standard tests.

Table I

| Composition | Intrinsic Viscosity in Acetone | Roll Release At 1 Min | Roll Release At 3 Min | Mill Stability Min. to Color | Mill Stability Color at 3 Min. | Clarity Percent WL | Clarity Percent Haze |
|---|---|---|---|---|---|---|---|
| Unmodified Polyvinyl Chloride | | F– | P– | 1¼ | yellow | 80.0 | 11.2 |
| A | 0.78 | E+ | E+ | 1¼ | yellow | 79.5 | 14.2 |
| B | 0.11 | E+ | E+ | 1¼ | yellow | 80.2 | 13.2 |
| C | | F+ | P+ | 1¼ | yellow | 70.0 | 15.0 |
| D | 0.83 | E+ | E+ | 1¼ | yellow | 79.0 | 12.3 |
| D | 0.87 | E+ | E+ | 1¼ | yellow | 80.5 | 11.8 |
| D | 1.0 | E+ | E+ | 1¼ | yellow | 81.2 | 15.1 |
| D | 0.84 | E+ | E+ | 1¼ | yellow | 70.0 | 18.9 |
| D | 0.91 | E+ | E | 1¼ | yellow | 78.4 | 9.9 |
| D | 1.0 | E | G– | 1¼ | yellow | 78.0 | 15.1 |
| D | 1.3 | G+ | G | 1¼ | yellow | 70.8 | 12.9 |
| D | 1.3 | G– | G– | 1¼ | yellow | 82.2 | 8.2 |
| D | 1.7 | F+ | F+ | 1¼ | yellow | 80.0 | 11.2 |

Composition A contains the modifier prepared in Example I, B contains a low molecular weight ($\overline{M}_v \approx 14,000$) polybutyl acrylate/N-vinyl pyrrolidine; 95/5, C contains a styrene/butyl acrylate; 60/40 copolymer modifier, and D contains a styrene/butyl acrylate first stage//methyl methacrylate second stage; 30/20//50.

EXAMPLE III

Various modified polyvinyl chloride compositions are prepared by milling 100 grams of mixtures of modifier and polyvinyl chloride for 5 minutes at 425°F., 21/20 rpm roll sheets followed by compression molding into ⅛ inch thick slabs at 350°F. according to a cycle of a 3-minute preheat; 2 minutes compression at 70 ton pressure followed by 3 minutes cooling under pressure. Table II shows processing results and clarity determinations for the various modified compositions indicated. Composition A contains a 30 parts styrene/20 parts butyl acrylate first stage and a 50 parts methyl methacrylate second stage polymeric modifier, composition B contains a low molecular weight ($\overline{M}_v \approx 14,000$) polybutyl acrylate, C contains a styrene/butyl acrylate;

Table II

| Composition | Intrinsic Viscosity In Acetone | Processing Flex Time (Minutes) | Processing Rolling Bank | Processing Hot Strength | Processing Thermoplasticity | Processing Release | Clarity Percent White Light Transmission | Clarity Percent Haze |
|---|---|---|---|---|---|---|---|---|
| Unmodified Polyvinyl Chloride | | 2 | F | F | F | G | 86.4 | 5.7 |
| A | 0.83 | 2 | G+ | G+ | G | E | 84.0 | 6.0 |
| A | 0.87 | 2 | G+ | G+ | G+ | E | 87.0 | 6.9 |

TABLE II—Continued

| Composition | Intrinsic Viscosity In Acetone | Processing | | | | | Clarity | |
|---|---|---|---|---|---|---|---|---|
| | | Flex Time (Minutes) | Rolling Bank | Hot Strength | Thermoplasticity | Release | Percent White Light Transmission | Percent Haze |
| A | 1.0 | 2 | G+ | G+ | G | E | 87.5 | 4.9 |
| A | 0.84 | 2 | G+ | G+ | G+ | E— | 86.0 | 7.6 |
| A | 0.91 | 1½ | G+ | G+ | G+ | E— | 89.0 | 5.1 |
| A | 1.0 | 1½ | G+ | G+ | G | E— | 87.5 | 6.5 |
| A | 1.3 | 1½ | G+ | G+ | G | E— | 83.0 | 10.6 |
| A | 1.3 | 1½ | G+ | G+ | G+ | E— | 84.6 | 9.0 |
| A | 1.7 | 1½ | G+ | G+ | G+ | E— | 86.2 | 5.8 |
| B | | 1½ | G | G | F+ | E+ | 84.5 | 5.9 |
| C | 0.11 | 3 | F+ | F+ | F+ | E+ | 85.0 | 9.4 |
| D | 0.96 | 2 | G+ | G | G | E+ | 87.0 | 5.7 |

60/40 copolymer modifier and D contains a 30 parts styrene/20 parts butyl acrylate first stage and a 45 parts methyl methacrylate/5 parts ethyl acrylate second stage polymeric modifier. Compositions A and D are prepared in accordance with the procedure of Example I except that where necessary to control molecular weight, a small percentage of n-dodecylmercaptan is added to the first stage monomer mixture.

This example illustrates the effect of varying molecular weight on processing and compositional properties.

EXAMPLE IV

In this example, the polymers shown in Table III are prepared in accordance with the procedure of Example I. The polymers are then incorporated into polyvinyl chloride compositions by the procedure of Example II and are tested for roll release and mill stability at 425°F. and 380°F. with the results as shown in Tables IV and V.

Table III

| | Composition | | Ration of First Stage/ Final Stage | Intrinsic Viscosity In Acetone First Stage | Intrinsic Viscosity In Acetone for Polymer |
|---|---|---|---|---|---|
| | First Stage | Final Stage | | | |
| A | styrene/ butyl acrylate; 30/20 | methyl methacrylate/ ethyl acrylate; 45/5 | 50/50 | 0.11 | 0.96 |
| B | styrene/ butyl acrylate; 36/24 | methyl methacrylate/ ethyl acrylate 36/4 | 60/40 | 0.13 | 0.91 |
| C | styrene/ butyl acrylate; 42/28 | methyl methacrylate/ ethyl acrylate 27/3 | 70/30 | 0.12 | 0.53 |

Table IV

| Composition | Percent of Total Polyvinyl Chloride Composition | Roll Release | | Mill Stability | |
|---|---|---|---|---|---|
| | | At 1 Minute | At 3 Minutes | Minutes to Color | Color at 3 Minutes |
| Unmodified Polyvinyl Chloride | | P | P— | 1 | orange |
| A | 1 | E— | G | 1¼ | yellow |
| A | 2 | G+ | G | 1¼ | yellow |
| A | 3 | E— | E | 1½ | yellow |
| B | 1 | E | G+ | 1¼ | yellow + |
| B | 2 | E | E+ | 1¼ | yellow |
| B | 3 | E— | E+ | 1½ | yellow |
| C | 1 | E— | E | 1¼ | yellow + |
| C | 2 | E— | E+ | 1¼ | yellow |
| C | 3 | E— | E+ | 1½ | yellow |

Table V

| Composition | Percent of Polyvinyl Chloride Composition | Processing | | | | | Clarity | | Static Heat Stability. 380°C. | |
|---|---|---|---|---|---|---|---|---|---|---|
| | | Flex Time (Minutes) | Rolling Bank | Hot Strength | Thermoplasticity | Release | Percent White Light Transmission | Percent Haze | Minutes to Color | Minutes to Char |
| Unmodified Polyvinyl Chloride | | 1¼–½ | F | F | F | G | 75.8 | 16.2 | 10 | 80 |
| A | 1 | ¼–½ | F+ | F+ | F+ | G | 81.1 | 10.6 | 20 | 90 |
| A | 3 | ¼–½ | F+ | G+ | G— | G | 79.0 | 12.7 | 20–30 | >90 |
| A | 5 | ¼–½ | F+ | G | G | G | 81.1 | 13.1 | 20–30 | >90 |
| B | 1 | ¼–½ | F+ | F+ | F+ | G | 79.6 | 12.6 | 10–20 | 90 |
| B | 3 | ¼–½ | F+ | G— | G— | G | 80.5 | 13.1 | 20–30 | >90 |
| B | 5 | ¼–½ | F+ | G | G | G | 84.1 | 7.3 | 20–30 | >90 |
| C | 1 | ¼–½ | F+ | F+ | F | G | 83.5 | 8.4 | 10–20 | 90 |
| C | 3 | ¼–½ | F+ | F+ | F+ | G | 81.6 | 9.6 | 20–30 | >90 |
| C | 5 | ¼–½ | F+ | F+ | F | G | 80.6 | 10.0 | 20–30 | >90 |

EXAMPLE V

In this example a multiphase acrylic composite polymer of the composition; first stage, 50 parts butyl acrylate; final stage, 45 parts methyl methacrylate/5 parts ethyl acrylate, is prepared in accordance with the procedure of Example I. The polymer is then incorporated into a polyvinyl chloride composition by the procedure of Example II and is tested for roll lease and mill stability at 425°F. with the results as shown in Table VI.

styrene/butyl acrylate (n-dodecyl mercaptan)//second stage: methyl methacrylate/ethyl acrylate; 36/24 (3%)//36/4. The composition contains 97 parts polyvinyl halide, 3 parts of the modifier; 2.0 parts of a tin stabilizer 0.8 parts of a glycerol monostearate internal lubricant and 0.2 parts of a fatty acid ester lubricant. Composition B contains 100 parts polyvinyl chloride, 2 parts of the tin stabilizer, 1 part of a low molecular weight polyethylene lubricant and 0.8 parts of the glycerol monostearate internal lubricant and 0.2 parts of Table VI

| Composition | Percent Modifier in Polyvinyl Chloride | Roll Release At 1½–2 Minutes | Roll Release At 5 Minutes | Heat Stability Minutes to Color | Heat Stability Relative Stability at 5 Minutes | Clarity Percent White Light Transmission | Clarity Percent Haze |
|---|---|---|---|---|---|---|---|
| Unmodified Polyvinyl Chloride | | P | P | ¾ | P | 80.0 | 8.8 |
| butyl acrylate// methyl methacrylate/ ethyl acrylate (50//45/5) | 5 | G+ | G+ | 1½–2 | G– | 29.6 | 93.2 |
| | 3 | G+ | G | 1½–2 | G– | 45.5 | 58.7 |
| | 1 | G | G+ | 1½–2 | G+ | | |

EXAMPLE VI

As pointed out above in the specification the processability of polyvinyl halide compositions can be improved with conventional lubricants at the expense of clarity. The following example illustrates the foregoing, comparing a conventional lubricant with a composition of the present invention. Table VII shows polyvinyl halide compositions containing the respective lubricants or modifier. In each instance, roll release is determined after 3 minutes milling at 425°F., 21/20 rpm. Clarity is determined after 7 minutes milling at 350°F., 26/20 rpm and compression molding into ⅛ inch thick sheets. Composition A is polyvinyl chloride modified with the modifier-first stage.

Table VII

| Composition | Roll Release | Clarity Percent White Light Transmission | Clarity Percent Haze |
|---|---|---|---|
| Unmodified Polyvinyl Chloride | P– | 87.5 | 6.9 |
| A | E | 87.0 | 4.0 |
| B | E– | 72.5 | 15.1 |
| C | G+ | 51.8 | 35.9 | the fatty acid ester lubricant. Composition C contains 100 parts polyvinyl chloride, 2 parts of the tin stabilizer, 0.8 parts of the glycerol monostearate internal lubricant and 1.5 parts of the fatty acid ester lubricant. The unmodified composition contains 100 parts polyvinyl chloride, 2 parts of the tin stabilizer, 0.8 parts of the glycerol monostearate internal lubricant and 0.2 parts of the fatty acid ester lubricant.

EXAMPLE VII

In this example, stocks weighing 100 grams are preflexed for 3 minutes at 350°F., 26/20 rpm, before milling 3 minutes at 425°F., 21/20 rpm. Proportions of monomers in the polymer modifier compositions are in parts, unless indicated percentage.

This example shows that the multiphase acrylic composite polymers of composition otherwise according to the present invention, but with a crosslinked first stage are not suitable in the present invention.

Table VIII

| Composition of Modifier First Stage | Composition of Modifier Final Stage | Roll Release At 1 Minute | Roll Release At 3 Minutes | Mill Stability Minutes to Color | Mill Stability Color at 3 Minutes | Clarity |
|---|---|---|---|---|---|---|
| Styrene/butyl-acrylate (n-dodecyl mercaptan); 36/24 (3%) | methyl methacrylate/ethyl-acrylate; 36/4 | E– | E | 1½ | yellow | clear |
| butylacrylate (n-dodecyl mercaptan); 50 (3%) | methyl methacrylate/ethyl-acrylate 45/5 | E | E+ | 1½ | yellow | opaque |
| butyl methacrylate (t-dodecyl mercaptan) 50 (6%) | methyl methacrylate/ethyl-acrylate 45/5 | G+ | G– | 1¼ | yellow + | opaque |

Table VIII—Continued

| Composition of Modifier | | Roll Release | | Mill Stability | | Clarity |
|---|---|---|---|---|---|---|
| | | At 1 Minute | At 3 Minutes | Minutes to Color | Color at 3 Minutes | |
| butylacrylate/ butylene diacrylate; 49.5/0.5 | methyl methacrylate | F+ | P+ | 1¼ | yellow + | opaque |
| Unmodified Polyvinyl Chloride | | P | P | 1 | yellow + | clear |

What is claimed is:

1. A multiphase acrylic composite polymer comprising 50 to 90 weight percent (A) a first non-crosslinked phase of viscosity average molecular weight of about 7,500 to 50,000 polymerized from a first monomer emulsion of at least 25 weight percent of at least one alkyl acrylate wherein said alkyl group has 1 to 18 carbon atoms, 0 to 75 weight percent of another acrylic monomer and 0 to 75 percent of another copolymerizable ethylenically unsaturated monomer; and 10 to 50 weight percent (B) a final, rigid thermoplastic phase polymerized in the presence of said first phase from an emulsion of about 35 to 100 weight percent of at least one monomer which is methacrylate, acrylate, styrene or substituted styrene, 0 to 65 weight percent of another copolymerizable ethylenically unsaturated monomer; wherein the rigid thermoplastic phase has a viscosity average molecular weight of from about $4 \times 10^5$ to $5 \times 10^6$.

2. The polymer of claim 1 in which said first phase (A) is polymerized from a monomer emulsion of 25 to 95 weight percent of the alkyl acrylate, 35 to 65 weight percent of the other acrylic monomer and 35 to 65 percent of another copolymerizable ethylenically unsaturated monomer.

3. The polymer of claim 1 in which said rigid thermoplastic phase is polymerized from an emulsion of 50 to 90 weight percent of at least one monomer which is a methacrylate, acrylate, styrene or substituted styrene, 5 to 15 weight percent of another acrylic monomer and 5 to 15 weight percent of another copolymerizable ethylenically unsaturated monomer.

4. The polymer of claim 1 in which the rigid thermoplastic phase is characterized by a viscosity average molecular weight of from 750,000 to $1 \times 10^6$.

5. The polymer of claim 1 comprising 50 to 70 weight percent of the first phase and 30 to 50 weight percent of the second phase.

* * * * *